3,066,140
PROCESS FOR PRODUCING DIALKYL (CARBAMOYLMETHYL) PHOSPHONATES
Angelo J. Speziale, Kirkwood, Mo., assignor to Monsanto Chemical Company, St. Louis, Mo., a corporation of Delaware
No Drawing. Filed May 24, 1956, Ser. No. 586,918
3 Claims. (Cl. 260—247.7)

This invention relates to novel organic compounds of phosphorus. More particularly, it relates to dialkyl (carbamoylmethyl) phosphonates and the method of preparation thereof.

These new compounds are phosphonate esters which conform to the general formula,

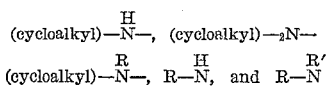

wherein $R_1$ represents an alkyl radical containing from one to four carbon atoms and Z represents a radical selected from the group consisting of morpholino, piperidino,

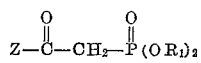

and wherein R and R′ each represents a monovalent aliphatic hydrocarbon radical.

In the new compounds, R and R′ may be the same or different radicals. Furthermore, it is to be understood that R and R′ may represent both the straight and branched chain and the saturated and unsaturated radicals.

The above compounds are prepared by the reaction of trialkyl phosphites of the formula, $P(OR_1)_3$, in which $R_1$ has the same meaning as above, with a halogen-substituted acetamide of the formula,

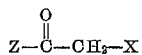

in which Z has the same meaning as above and X is a member of the group consisting of chlorine and bromine.

The reaction takes place according to the following equation:

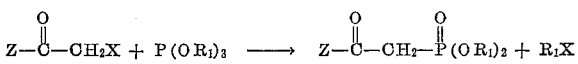

The trialkyl phosphites useful in the above reactions are, for example, trimethyl phosphite, triethyl phosphite, triisopropyl phosphite, tri-n-butyl phosphite, tri-sec-butyl phosphite, etc.

The halogen-substituted acetamides which are useful in the above reaction may be obtained by the reaction of chloroacetyl chloride with the appropriate amine, this method of preparation is aptly described in 78 J.A.C.S. 2556 (1956). Suitable amines which can be employed in the preparation of the acetamide reactants include, for example, the aliphatic primary amines, such as methylamine, ethylamine, isopropylamine, butylamine, n-octylamine, 2-ethylhexylamine, t-butylamine, 1,1,2-trimethylpropylamine, 3,3,5-trimethylhexylamine, cetylamine, tetradecylamine, hexadecylamine, 2,2,4-trimethylpentylamine, dodecylamine, etc.; cycloalkylamines, such as cyclopentylamine, cyclohexylamine, cycloheptylamine, etc.; the unsaturated primary amines, such as allylamine, propargylamine, methallylamine, etc.; secondary amines which are suitable include, for example, the dialkylamines, such as dimethylamine, diisopropylamine, dibutylamine, N-methyl-N-butylamine, diamylamine, dihexylamine, di-2-ethylhexylamine, dioctylamine, didodecylamine, ditetradecylamine, N-isoamyl-N-hexylamine, N-ethyl-N-octylamine, dioctadecylamine, etc.; the unsaturated secondary amines, such as diallylamine, dipropargylamine, dimethallylamine, N-ethyl-N-allylamine, N-octyl-N-allylamine, N-methyl-N-propargylamine, etc.; the secondary cycloalkylamines, such as dicyclohexylamine, N-methyl-N-cyclohexylamine, dicyclopentylamine, etc.; the heterocyclic amines, such as piperidine and morpholine, can also be used.

The above reaction can be carried out by reacting the halogen-substituted acetamide with at least a stoichiometric equivalent amount of the trialkyl phosphite. A slight excess of the trialkyl phosphite may be advantageously employed, since this is a solvent for most of the acetamides used. Where the halogen-substituted acetamides are insoluble in the trialkyl phosphite, it is desirable to employ a high-boiling, non-reactive solvent, one with a boiling point above 100° C. and preferably around 150° C., such as o-xylene, p-xylene, m-xylene, toluene, etc.

The reaction is preferably carried out at a temperature within the range of from about 20° to 150° C. However, temperatures outside of this range can be employed, depending upon the type of reactants and solvents utilized.

Representative examples of the novel phosphonates of the present invention include the following:

Dimethyl (dimethylcarbamoylmethyl) phosphonate
Dimethyl (diallylcarbamoylmethyl) phosphonate
Dimethyl (ethylcarbamoylmethyl) phosphonate
Dimethyl (di-2-ethylhexylcarbamoylmethyl) phosphonate
Dimethyl (dodecylcarbamoylmethyl) phosphonate
Dimethyl (octadecylcarbamoylmethyl) phosphonate
Dimethyl (di-t-butylcarbamoylmethyl) phosphonate
Dimethyl (morpholinocarbamoylmethyl) phosphonate
Dimethyl (dicyclohexylcarbamoylmethyl) phosphonate
Diethyl (N-methyl-N-ethylcarbamoylmethyl) phosphonate
Diethyl (dibutylcarbamoylmethyl) phosphonate
Diethyl (N-amylcarbamoylmethyl) phosphonate
Diethyl (propargylcarbamoylmethyl) phosphonate
Diethyl (di-tetradecylcarbamoylmethyl) phosphonate
Diethyl (N-butyl-N-cyclohexylcarbamoylmethyl) phosphonate
Diethyl (piperidinocarbamoylmethyl) phosphonate
Diethyl (N-methyl-N-propagylcarbamoylmethyl) phosphonate
Diisopropyl (diethylcarbamoylmethyl) phosphonate
Diisopropyl (di-n-octylcarbamoylmethyl) phosphonate
Diisopropyl (nonylcarbamoylmethyl) phosphonate
Diisopropyl (N-hexyl-N-cyclohexylcarbamoylmethyl) phosphonate
Diisopropyl (N-butyl-N-pentadecylcarbamoylmethyl) phosphonate
Diisopropyl (t-butylcarbamoylmethyl) phosphonate
Diisopropyl (cetylcarbamoylmethyl) phosphonate
Dibutyl (heptylcarbamoylmethyl) phosphonate
Dibutyl (di-cyclopentylcarbamoylmethyl) phosphonate
Dibutyl (N-ethyl-N-allylcarbamoylmethyl) phosphonate
Dibutyl (piperidinocarbamoylmethyl) phosphonate The novel compounds of this invention are stable, rather high-boiling materials which range from viscous liquids to waxy or crystalline solids. They are generally useful for a wide variety of industrial purposes, for example, as plasticizers for synthetic resins and plastics, flameproofing agents, extreme pressure lubricant additives, and as intermediates for the production of other lubricating oil adjuvants. The compounds of this invention include biologically active compounds which are useful as insecticides, rodenticides, and the like.

The following examples serve to illustrate the novel compounds of this invention and their preparation. In the examples, all parts are by weight, unless specified otherwise.

EXAMPLE I

*Diethyl (Diethylcarbamoylmethyl) Phosphonate*

Sixty-seven parts of trimethyl phosphite (0.41 mol) are placed in a suitable reaction vessel and heated to 100° C. Sixty parts (0.4 mol) of alpha-chloro-N,N-diethylacetamide are then added slowly. After about 5 parts are added, the temperature rises and ethyl chloride is evolved. The addition is then continued at 135–140° C. and completed in approximately 55 minutes. The solution is then heated at 140–155° C. for 75 minutes. The product is distilled and the low-boiling fraction (40–110°/0.6 mm.) is collected and discarded. The main fraction distills at 135°/1.2 mm. and has a refractive index, $n_D^{25}$ of 1.4560. 54.8 parts of diethyl (diethylcarbamoylmethyl) phosphonate, representing a yield of 54.8% based on the alpha-chloro-N,N-diethylacetamide charged, are obtained, which analyzes as follows:

Calc'd for: N, 5.58; P, 12.33. Found: N, 5.55; P, 12.00.

EXAMPLE II

*Diethyl (Diallylcarbamoylmethyl) Phosphonate*

34.6 parts of N,N-diallyl-alpha-chloroacetamide are slowly added, over a period of one hour, to 33 parts of triethyl phosphite at 140° C. Ethyl chloride is evolved during the addition, and the heating is continued for another hour. The product is then distilled and the main fraction distills at 147° C./1.3 mm., and has a refractive index, $n_D^{25}$ 1.4718. Forty-three parts of diethyl (diallylcarbamoylmethyl) phosphonate, representing a yield of 78%, are obtained. Analysis of the product:

Calc'd for: N, 5.09; P, 11.25. Found: N, 5.02; P, 11.23.

EXAMPLE III

*Diethyl (n-Amylcarbamoylmethyl) Phosphonate*

84.7 parts of N-n-amyl-alpha-chloroacetamide are added slowly to the 88 parts of triethyl phosphite at 140° C., and after the addition is complete, the solution is heated at 150° C. for one hour. The product is then distilled and the main fraction, 101 parts of diethyl (n-amylcarbamoylmethyl) phosphonate, boiling at 158° C./1.2 mm., is obtained, which represents a yield of 80%. Analysis of product:

Calc'd for: N, 5.28; P, 11.67; C, 49.80; H, 9.12. Found: N, 5.33; P, 11.54; C, 49.29; H, 8.84.

EXAMPLE IV

*Diethyl (Cyclohexylcarbamoylmethyl) Phosphonate*

Eighty-eight parts of alpha-chloro-N-cyclohexylacetamide are added to a solution containing 83 parts of triethyl phosphite and 100 parts of o-xylene at 130–140° C. over a period of one hour. The reaction mixture is then heated up and maintained at about 145° C. for one hour. The solvent is removed by distillation and the product is recrystallized from Skellysolve B. The product, 118 parts of diethyl (cyclohexylcarbamoylmethyl) phosphonate, having a melting point of 88–89° C., is obtained in 85% yield. Analysis:

Calc'd for: C, 51.97; H, 8.72; N, 5.05. Found: C, 52.10; H, 8.61; N, 4.97.

EXAMPLE V

*Diethyl (Piperidinocarbamoylmethyl) Phosphonate*

166 parts of triethyl phosphite are heated to 150° C., and 161 parts of 1(chloroacetyl) piperidine are slowly added over a period of one hour. The heating is then continued for 1½ hours at 140–150° C. The solution is then subjected to fractional distillation, the product, 167 parts of diethyl (piperidinocarbamoylmethyl) phosphonate, boiling at 156° C./2 mm., is obtained, representing a yield of 64%. The product has a refractive index of $n_D^{25}$ 1.4802 and analyzes as follows:

Calc'd for: C, 50.18; H, 8.42; N, 5.32. Found: C, 50.52; H, 8.63; N, 5.52.

EXAMPLE VI

*Diethyl (Morpholinocarbamoylmethyl) Phosphonate*

Employing the procedure of Example V, but replacing the 1(chloroacetyl) piperidine with an equimolecular amount of 4(chloroacetyl) morpholine, a good yield of diethyl (morpholinocarbamoylmethyl) phosphonate is obtained. This product has a boiling point of 167–170° C./1.4 mm. and a refractive index of $n_D^{25}$ 1.4806. Analysis:

Calc'd for: C, 45.28; H, 7.60; N, 5.27. Found: C, 45.31; H, 7.63; N, 5.26.

EXAMPLE VII

*Dipropyl (Diisopropylcarbamoylmethyl) Phosphonate*

Employing the procedure of Example I, but replacing triethyl phosphite with an equimolecular amount of tripropyl phosphite and the alpha-chloro-N,N-diethylacetamide with an equimolecular amount of alpha-chloro-N,N-diisopropylacetamide, a good yield of dipropyl (diisopropylcarbamoylmethyl) phosphonate is obtained.

EXAMPLE VIII

*Dipropyl (t-Butylcarbamoylmethyl) Phosphonate*

Employing the procedure of Example VII, but replacing the alpha-chloro-N,N-diisopropylacetamide with an equimolecular amount of t-butyl-alpha-chloroacetamide, a good yield of dipropyl (t-butylcarbamoylmethyl) phosphonate is obtained.

EXAMPLE IX

*Dipropyl (Di-2-Ethylhexylcarbamoylmethyl) Phosphonate*

Employing the procedure of Example VII, but replacing the alpha-chloro-N,N-diisopropylacetamide with an equimolecular amount of alpha-chloro-N,N-di-2-ethylhexylacetamide, a good yield of dipropyl (di-2-ethylhexylcarbamoylmethyl) phosphonate is obtained.

EXAMPLE X

*Dipropyl (N-Ethyl-N-Cyclohexylcarbamoylmethyl) Phosphonate*

Employing the procedure of Example IV, but replacing the alpha-chloro-N-cyclohexylacetamide with an equimolecular amount of alpha-chloro-N-ethyl-N-cyclohexylacetamide, a good yield of dipropyl (N-ethyl-N-cyclohexylcarbamoylmethyl) phosphate is obtained.

EXAMPLE XI

*Dibutyl (N-Methyl-N-Butylcarbamoylmethyl) Phosphonate*

Employing the procedure of Example I, but replacing the triethyl phosphite with an equimolecular amount of tributyl phosphite and the alpha-chloro-N,N-diethylacetamide with an equimolecular amount of alpha-chloro-N-methyl-N-butylacetamide, a good yield of dibutyl (N-methyl-N-butylcarbamoylmethyl) phosphonate is obtained.

EXAMPLE XII

*Dibutyl (Dicyclohexylcarbamoylmethyl) Phosphonate*

Employing the procedure of Example IV, but replacing the alpha-chloro-N-cyclohexylacetamide with an equimolecular amount of alpha-chloro-N,N-dicyclohexylacetamide, a good yield of dibutyl (dicyclohexylcarbamoylmethyl) phosphonate is obtained.

EXAMPLE XIII

*Dibutyl (Dodecylcarbamoylmethyl) Phosphonate*

Employing the procedure of Example XI, but replacing the alpha-chloro-N-methyl-N-butylacetamide with an equimolecular amount of alpha-chloro-N-dodecylacetamide, a good yield of dibutyl (dodecylcarbamoylmethyl) phosphonate is obtained.

EXAMPLE XIV

Dibutyl (Dimethylcarbamoylmethyl) Phosphonate

Employing the procedure of Example XI, but replacing the alpha-chloro-N-methyl-N-butylacetamide with an equimolecular amount of alpha-chloro-N,N-dimethylacetamide, a good yield of dibutyl (dimethylcarbamoylmethyl) phosphonate is obtained.

EXAMPLE XV

Dibutyl (n-Octylcarbamoylmethyl) Phosphonate

Employing the procedure of Example XI, but replacing the alpha-chloro-N-methyl-N-butylacetamide with an equimolecular amount of alpha-chloro-N,n-octylacetamide, a good yield of dibutyl (n-octylcarbamoylmethyl) phosphonate is obtained.

It is to be understood that the foregoing detailed description is given merely by way of illustration and that many variations may be made therein without departing from the spirit of this invention.

What is claimed is:

1. The method of preparing phosphonates of the formula,

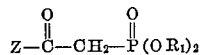

wherein $R_1$ is an alkyl radical containing from one to four carbon atoms and Z represents a monovalent radical obtained by the removal of one hydrogen atom attached to the nitrogen atom of an aliphatic hydrocarbon amine which contains up to eighteen carbon atoms in a single substituent, which comprises contacting a halogen-substituted acetamide of the formula,

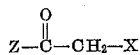

wherein Z has the same meaning as above and X is a member of the group consisting of chlorine and bromine, with a trialkyl phosphite of the formula, $$P(OR_2)_3$$

wherein $R_1$ has the same meaning as above.

2. The method of preparing phosphonates of the formula,

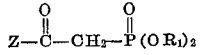

wherein $R_1$ is an alkyl radical containing from one to four carbon atoms and Z represents a monovalent radical selected from the group consisting of morpholino, piperidino,

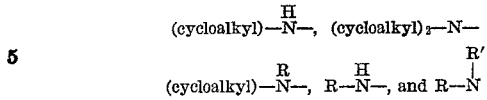

wherein R and R' each represents a monovalent aliphatic hydrocarbon radical having up to eighteen carbon atoms in a single substituent, said cycloalkyl radicals having from five to seven carbon atoms which comprises contacting a halogen-substituted acetamide of the formula,

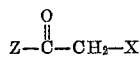

wherein Z has the same meaning as above and X is a member of the group consisting of chlorine and bromine, with a trialkyl phosphite of the formula, $P(OR_1)_3$, wherein $R_1$ has the same meaning as above.

3. The method of preparing a phosphonate of the formula,

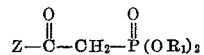

wherein $R_1$ is an alkyl radical containing from one to four carbon atoms and Z represents a monovalent radical obtained by the removal of one hydrogen atom attached to the nitrogen atom of a cycloalkyl amine in which said cycloalkyl group contains from five to seven carbon atoms, which comprises contacting a halogen-substituted acetamide of the formula,

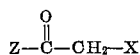

wherein Z has the same meaning as above and X is a member of the group consisting of chlorine and bromine, with a trialkyl phosphite of the formula, $$P(OR_1)_3$$

wherein $R_1$ has the same meaning as above.

References Cited in the file of this patent

UNITED STATES PATENTS 2,668,800　Johnston _____ Feb. 9, 1954

FOREIGN PATENTS 508,891　Canada _____ Jan. 4, 1955

OTHER REFERENCES

Kamai et al.: Chem. Abst., vol. 45, page 542 (1951).

UNITED STATES PATENT OFFICE
CERTIFICATE OF CORRECTION

Patent No. 3,066,140                           November 27, 1962

Angelo J. Speziale

It is hereby certified that error appears in the above numbered patent requiring correction and that the said Letters Patent should read as corrected below.

Column 5, line 43, for the formula reading $P(OR_2)_3$        read        $P(OR_1)_3$ Signed and sealed this 23rd day of July 1963.

(SEAL)
Attest:

ERNEST W. SWIDER                           DAVID L. LADD
Attesting Officer                             Commissioner of Patents